(12) United States Patent
Pilard et al.

(10) Patent No.: US 11,330,233 B2
(45) Date of Patent: May 10, 2022

(54) DEVICE AND METHOD FOR PROJECTING AN IMAGE

(71) Applicant: Robert Bosch GmbH, Stuttgart (DE)

(72) Inventors: Gael Pilard, Wankheim (DE); Peter Ostertag, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/766,154

(22) PCT Filed: Nov. 15, 2018

(86) PCT No.: PCT/EP2018/081445
§ 371 (c)(1),
(2) Date: May 21, 2020

(87) PCT Pub. No.: WO2019/141403
PCT Pub. Date: Jul. 25, 2019

(65) Prior Publication Data
US 2020/0366875 A1    Nov. 19, 2020

(30) Foreign Application Priority Data

Jan. 17, 2018 (DE) .......................... 102018200696

(51) Int. Cl.
*H04N 9/31* (2006.01)
*G02B 26/10* (2006.01)

(52) U.S. Cl.
CPC ......... *H04N 9/3135* (2013.01); *G02B 26/101* (2013.01); *H04N 9/3197* (2013.01)

(58) Field of Classification Search
CPC ... H04N 9/3135; H04N 9/3197; G02B 26/101

USPC ......................................................... 348/759
See application file for complete search history.

(56) References Cited

U.S. PATENT DOCUMENTS

| 2009/0147224 A1* | 6/2009 | Kurozuka | H04N 9/3129 353/98 |
| 2009/0185249 A1* | 7/2009 | Obi | G02B 26/0816 359/198.1 |
| 2009/0316243 A1 | 12/2009 | Tsuida | |
| 2010/0073580 A1* | 3/2010 | Ritz | G09F 19/18 348/745 |

(Continued)

FOREIGN PATENT DOCUMENTS

| DE | 102008054784 A1 | 6/2010 |
| DE | 102014215013 A1 | 2/2016 |

(Continued)

OTHER PUBLICATIONS

International Search Report for PCT/EP2018/081445, dated Mar. 6, 2019.

*Primary Examiner* — Michael Lee
(74) *Attorney, Agent, or Firm* — Norton Rose Fulbright US LLP; Gerard Messina

(57) ABSTRACT

A device for projecting an image. The device has a laser device, which is developed to emit a laser beam, the laser device having a modulation unit, which is developed to modulate image data onto the laser beam; and a micromirror device, which is developed to deflect the laser beam in a linear manner. The modulation unit is developed to modulate the laser beam in such a way that a predefined optical warning signal is emitted in a region around reversal points of the linear deflection.

10 Claims, 6 Drawing Sheets

(56) References Cited

U.S. PATENT DOCUMENTS

2018/0091784 A1* 3/2018 Dutton .................. G03B 21/53
2018/0295331 A1* 10/2018 Tardif ................. H04N 9/3135
2021/0174660 A1* 6/2021 Kamimura ............ G08B 21/22

FOREIGN PATENT DOCUMENTS

| JP | 2005031527 A | 2/2005 |
| JP | 2005309162 A | 11/2005 |
| KR | 20120099845 A | 9/2012 |

* cited by examiner

DEVICE AND METHOD FOR PROJECTING AN IMAGE

FIELD

The present invention relates to a device for an image projection and to a method for projecting an image. More specifically, the present invention relates to a laser scanner projector such as for a portable device.

BACKGROUND INFORMATION

Laser scanners provided with micromirrors can be used for the projection of images, in which case the micromirrors deflect the emitted laser beam. For instance, a micromirror which is pivotable about two axes that are orthogonal to each other may be used to generate a two-dimensional image. Toward this end, the micromirror is normally resonantly set into oscillations at a rapid frequency about a first axis, while the micromirror is deflected in a quasi-static manner at a slow frequency about the second axis. Two mutually perpendicular sinusoidal oscillations having different frequencies are superimposing one another in this way. This results in an essentially linear movement of the laser, and a line is scanned during the half period of the fast deflection, and a frame having a multitude of lines is scanned during the half period of the slow deflection.

An exemplary micromirror device having a two-dimensionally deflectable micromirror is described in German Patent Application No. DE 10 2008 054784 A1.

Instead of a single micromirror, it is also possible to provide two micromirrors, each being pivotable about a pivot axis, with the pivot axes being orthogonal to each other. The frequencies of the deflections of the micromirrors differ, so that linear scanning is possible once again.

When employing such projectors, eye safety has to be taken into account because of the used lasers. The lasers are subdivided into different classes according to DIN EN 60825-1, which differ with regard to the risk to the human eye. For example, the maximum power output by a laser of the 3R class is greater by a factor of 5 than that of a laser of Class 2. The maximum permissible exposure (MPE), which denotes the highest power or energy density that is still classified as safe for the human eye, may be examined for the classification of the lasers.

To ascertain the maximally permissible energy or power of a laser of a scanning unit, different scanning configurations of the scanning unit have to be taken into account.

According to a first criterion, the output energy is calculated while the laser beam executes a single sweep across the pupil. According to a second criterion, the laser beam sweeps twice across the eye or multiple times. According to a third criterion, the energy emitted to the pupil during a full frame is considered. According to a fourth criterion, the energy emitted during a period of time up to the maximum exposure time is taken into account. For laser class 2, for example, the maximum exposure time may amount to 0.25 seconds.

Corresponding calculations are carried out for different distances between the pupil and the scanning unit, which begin at approximately 100 millimeters. The greatest restrictions result when the eye is focused on the scanning unit.

The different criteria are of different importance for different angular positions of the micromirrors, i.e., for different solid angles of the scanned region.

SUMMARY

The present invention provides a device for projecting an image and a method for projecting an image.

According to a first aspect, the present invention provides a device for projecting an image using a laser device and a micromirror device. In one example embodiment of the present invention, the laser device emits a laser beam and furthermore has a modulation unit which modulates image data onto the laser beam. The micromirror device deflects the laser beam in a linear manner. In addition, the modulation unit is developed to modulate the laser beam in such a way that a predefined optical warning signal is emitted in a region around reversal points of the linear deflection.

According to a second aspect, the present invention provides a method for projecting an image. In one example embodiment of the present invention, a laser beam is emitted with the aid of a laser device, with image data being modulated onto the laser beam. The laser beam is deflected in a linear manner by a micromirror device. The laser beam is modulated in such a way that a predefined optical warning signal is emitted in a region around reversal points of the linear deflection.

Preferred embodiments of the present invention are described herein.

One recognition on which the present invention is based is that the edge regions of the scanned solid angle region are particularly hazardous to the human eye. The edge regions are the particular regions in which the laser beam changes direction and a new line is scanned.

However, by emitting an optical warning signal in this outer region, a person who walks into the area being scanned will close the eyes because of the eyelid closure reflex already as a result of the warning signal. In this way, the eyes of such a person will not be exposed to the dangerous radiation in the first place. The eye safety is able to be increased in this way.

According to one preferred further development of the example device according to the present invention, the modulation unit is developed to carry out the modulation of the laser beam for the emission of the optical warning signal as a function of the modulated image data. For example, the emitted image may pose a particular hazard to the eye, for instance in the presence of large white regions of high intensity. In this case, the warning signal is preferably emitted continuously. The warning signal may particularly be emitted at the reversal point of each line. The region around the reversal point at the time when the warning signal is emitted may also depend on the intensity of the image data and preferably be greater the stronger the intensity of the image data. In addition, the warning signal may be emitted only if an intensity calculated on the basis of the image data exceeds a predefined threshold value. For example, the total intensity during a frame may be calculated and compared with the predefined threshold value.

According to one preferred further development of the present invention, the example device has an arithmetic device, which calculates the energy of the laser beam during the deflection along at least one line. The modulation unit is developed to carry out the modulation of the laser beam for the emission of the optical warning signal as a function of the calculated energy. For instance, the energy of the laser beam may be calculated during a predefined number of lines to be scanned next. More specifically, the two lines to be scanned next may be taken into account. If the ascertained energy exceeds a predefined threshold value, then a warning signal is output at the end of the next scanned line by a modulation of the laser beam. In the other case, no warning signal will be output. The threshold value, for example, is able to be specified based on an accessible energy limit (accessible emission limit, AEL). In particular, the threshold value may be equal to a predefined percentage of the accessible emission limit such as 90%. The modulation unit thus emits the optical warning signal at the end of the line if the energy of the laser beam during the deflection along this line and/or along adjacent lines exceeds a predefined threshold value.

According to a preferred further development of the example device in accordance with the present invention, the modulation unit modulates the image data onto the laser beam in such a way that edge regions of the lines are shielded, with the exception of the warning signal. Shielding the edge regions makes it possible to correct distortions. In addition, a clearance is created between the region of the displayed image and the region in which the warning signal is displayed. Since the warning signal already triggers the eyelid closure reflex, a person who moves into the scanned region has already closed the eyes or averted the eyes before reaching the actual image content. This makes it possible to avoid eye injuries.

According to a preferred further development of the example device in accordance with the present invention, the modulation unit is developed to carry out the modulation of the laser beam for the emission of the optical warning signal as a function of a size of the shielded edge region. The greater the distortion, the greater the shielded edge region. Since the danger from the laser beam to the eyes decreases from the edge in the direction of the center, the laser thus poses less of a risk. Accordingly, the warning signal may be displayed only when the size of the shielded edge region drops below a predefined threshold value.

According to a preferred further development of the present invention, the example device has a sensor device which outputs a detection signal if a person is approaching a solid angle region scanned by the micromirror device. The modulation unit carries out the modulation of the laser beam for the emission of the optical warning signal as a function of the detection signal. The optical warning signal may thus be displayed only if a person who is moving into the scanned solid angle region is detected. This avoids an unnecessary display of warning signals and bothers observers to a lesser degree.

According to one specific embodiment of the present invention, the warning signal may be made up of individual pulses or pixels directly at the reversal points or in the vicinity of the reversal points. For example, the laser device may have a green, a blue and a red laser. The warning signal may be emitted only by the red laser. The observer therefore sees a line-shaped red region at the edge of the scanned solid angle region.

According to one further development of the example device in accordance with the present invention, the modulation unit is developed to modulate the laser beam in such a way that a band-shaped region of a predefined color and/or a predefined intensity along the reversal points of the linear deflection is continuously emitted as an optical warning signal. The band-shaped region may preferably be generated by the red laser again.

The modulation unit preferably modulates the laser beam in such a way that the optical warning signal poses no risk to the human eye.

BRIEF DESCRIPTION OF THE DRAWINGS

Identical or functionally equivalent elements and devices have been provided with the same reference numerals in all of the figures.

DETAILED DESCRIPTION OF EXAMPLE EMBODIMENTS

Below, it will first be described why the edge region of a solid angle region that is scanned by laser light deflected by a micromirror constitutes a particular hazard to the human eye.

Figure 1:
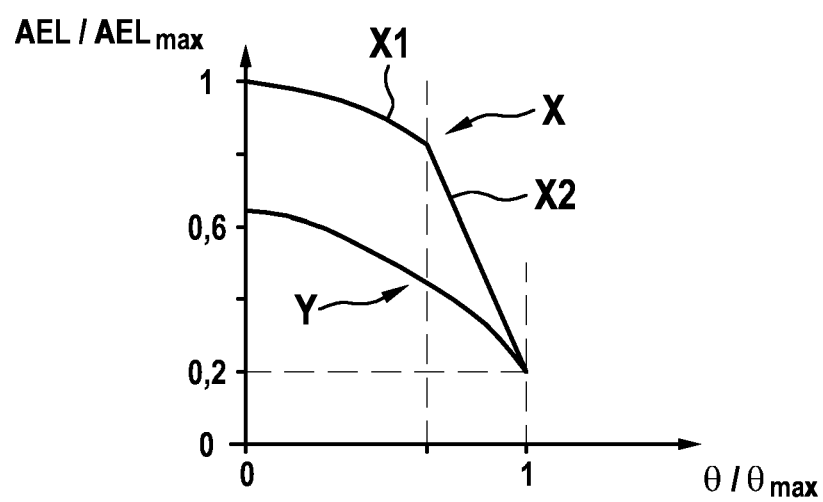
FIG. 1 shows a schematic characteristic of the accessible emission limit as a function of the scanning angle.

In this context, FIG. 1 illustrates the accessible emission limit (AEL) as a function of a scanning angle $\theta$ of the micromirror about the fast axis, with both variables being scaled to one. The accessible emission limit for the selected laser class is established on the basis of the maximally permissible exposure (MPE).

As may be gathered for a first curve X, an essentially sinusoidal characteristic X1 of the accessible emission limit comes about for small scanning angles $\theta$, i.e. close to the center of the scanned solid angle region. The restriction of the accessible emission limit finds its source essentially in the afore-described first criterion, i.e. the one-time scanning of the eye. For larger scanning angles $\theta$, i.e. closer to the reversal point, the time interval between two consecutive scans of the eye becomes smaller. This results in the most stringent limitation by the afore-described second criterion, i.e. the two-time scanning of the eye. An essentially linear region X2 is produced as a result.

Because of the oscillating movement of the micromirror, the brightness distribution in general is not uniform. For example, the displayed image in lateral regions could appear darker than in the center if illustrated first curve X is utilized for determining the power of the laser. A sine correction may be performed to improve the situation. However, it must then be ensured that the power does not exceed the accessible emission limit, from which a second curve Y results.

The accessible emission limit is defined as the particular power of the light that passes through the pupil at a given scanning angle. The laser beam follows a sinusoidal movement. The average power P_m of the light when passing through the pupil is given by the following formula:

$$P_m = \frac{P_0}{t_2 - t_1} \int_{t_1}^{t_2} \cos(\omega t) dt = \frac{P_0}{\omega(t_2 - t_1)} [\sin(\omega t)]_{t_1}^{t_2}$$

In this context, t1 and t2 denote the times at which the beam reaches or emerges from the pupil, respectively. Furthermore, $\omega = 2\pi f$ is the fast angular frequency of the laser scanner and f is the resonant frequency of the fast axis. P_0 is the instantaneous power in the center of the image.

The sinusoidal resonant movement of the micromirror is able to be described by the following equation for scanning angle θ:

$$\theta(t) = \theta_{h\_max} * \cos(\omega t + \varphi)$$

If phase angle $\varphi=\pi/2$ is selected at instant t=0, then the following results:

$$\theta = \theta_{h\_max} \sin(\omega t) \Rightarrow t = \frac{1}{\omega} \sin^{-1}\left(\frac{\theta}{\theta_{h\_max}}\right) \Rightarrow [\sin(\omega t)]_{t_1}^{t_2} = \frac{\theta_2 - \theta_1}{\theta_{h\_max}}$$

Here, θ_h_max denotes the maximum mechanical angle of the amplitude of the resonant axis.

The time the beam requires to scan pupil R is given as Tp=t2−t1. The angular difference θ_p=θ(t2)−θ(t1) corresponds to the angle extension of pupil R.

Figure 2:
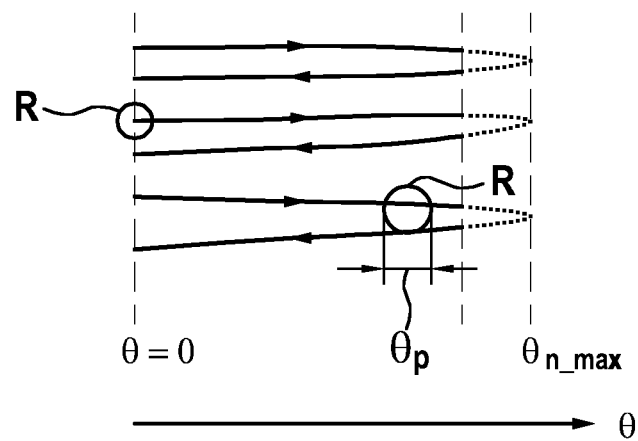
FIG. 2 shows a schematic sketch to describe the ascertainment of the accessible emission limit.

The mentioned relations are illustrated in FIG. 2.

It is possible to calculate the corresponding instantaneous power in the center of the image for each value of the accessible emission limit along the scanning movement by an integration of average power P_m:

$$P_0 = \frac{T_p * 2\pi * f_h * \theta_{h\_max}}{\theta_P} * P_m$$

The time the laser requires to scan the pupil is greater at the edge of the image than in the center because of the movement of the laser. At the same time, however, the average power Pm is lower so that the calculated value of instantaneous power P0 is generally lower when the pupil is located in the edge region of the image. The lowest value of instantaneous power P0 defines the maximally permissible power of the light in the center of the image if the intensity is corrected in a homogeneous manner.

If instantaneous power P0 were to be increased, the instantaneous power in the edge region would exceed the accessible emission limit and the device would not satisfy the criteria of the laser class.

Utilizing the accessible emission limit for assessing the hazard has the result that the edge region of the image is more hazardous than the central region of the image. However, it is especially this region that is of particular relevance because a person will normally approach the scanned region from the side.

Figure 3:
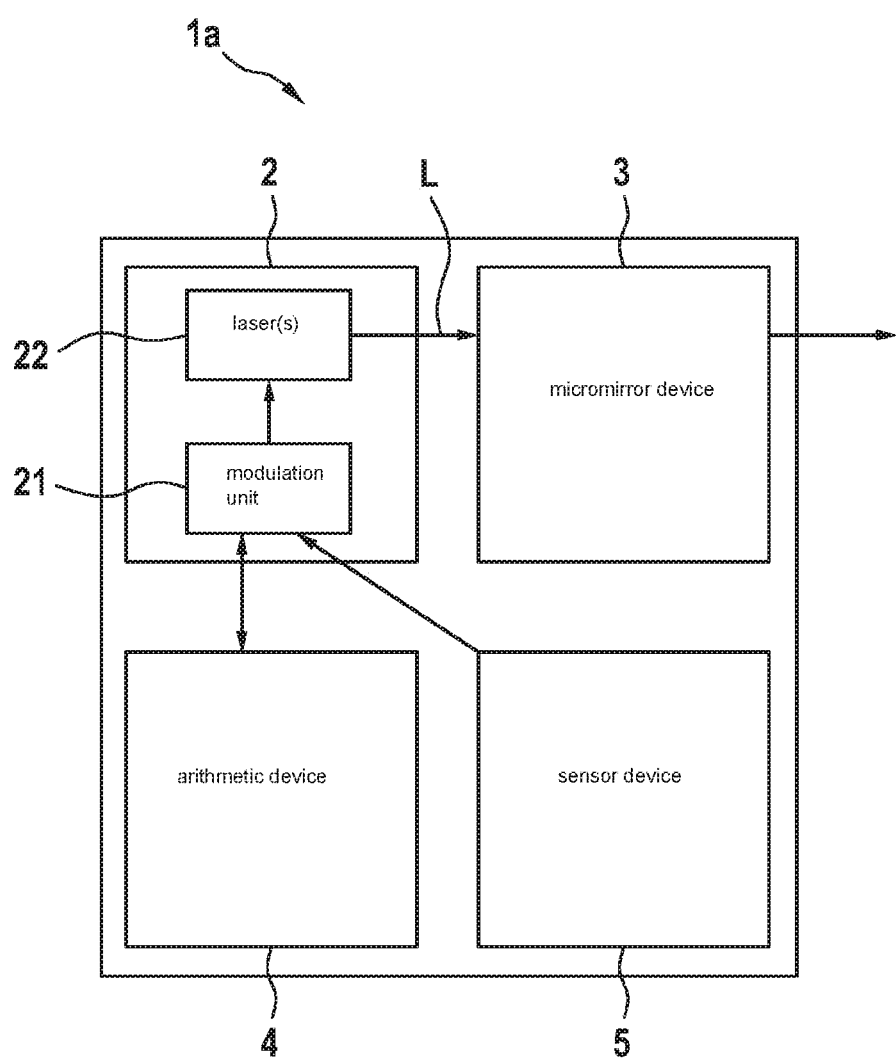
FIG. 3 shows a schematic block diagram of a device for projecting an image according to a first specific embodiment of the present invention.

FIG. 3 shows a block diagram of a device 1a for projecting an image according to a specific embodiment of the present invention.

Device 1 has a laser device 2 having one or more laser(s) 22, which emit(s) a laser beam L. In particular a red, a green and a blue laser may be provided, each of them emitting individual beams, with laser beam L being generated by combining the individual beams.

Lasers 22 are actuated by a modulation unit 21, which modulates the power of lasers 22 in such a way that corresponding image data are modulated onto laser beam L. The image data are able to be transmitted via an interface from external devices to modulation unit 21, for example.

In addition, device 1a includes a micromirror device 3, which deflects laser beam L in a linear manner.

Modulation unit 21 modulates laser beam L in such a way that a predefined optical warning signal is emitted in a region around the reversal points of the linear deflection. An optical warning signal may be understood as pulsed light signals, which are emitted in the form of points or lines at the reversal point of the line. If such light signals are emitted in multiple consecutive lines, then a linear or band-shaped optical signal results for the observer, which is generated directly at the reversal points or in their vicinity.

An arithmetic device 4 is optionally provided in addition, which calculates the energy of laser beam L during the deflection along at least one line. If the energy exceeds a predefined threshold value, which is determined as a function of the accessible emission limit, modulation unit 21 emits the optical warning signal at the end of the at least one line.

Optionally, a sensor device 5 is also provided, which is able to identify persons who are approaching the solid angle region scanned with the aid of micromirror device 3. For example, sensor device 5 may include a photoelectric barrier or a camera system, which detects the movement of persons. If it is detected that a person or, in general, an object moves toward the scanned solid angle region, then modulation unit 21 generates the optical warning signal.

Figure 4:
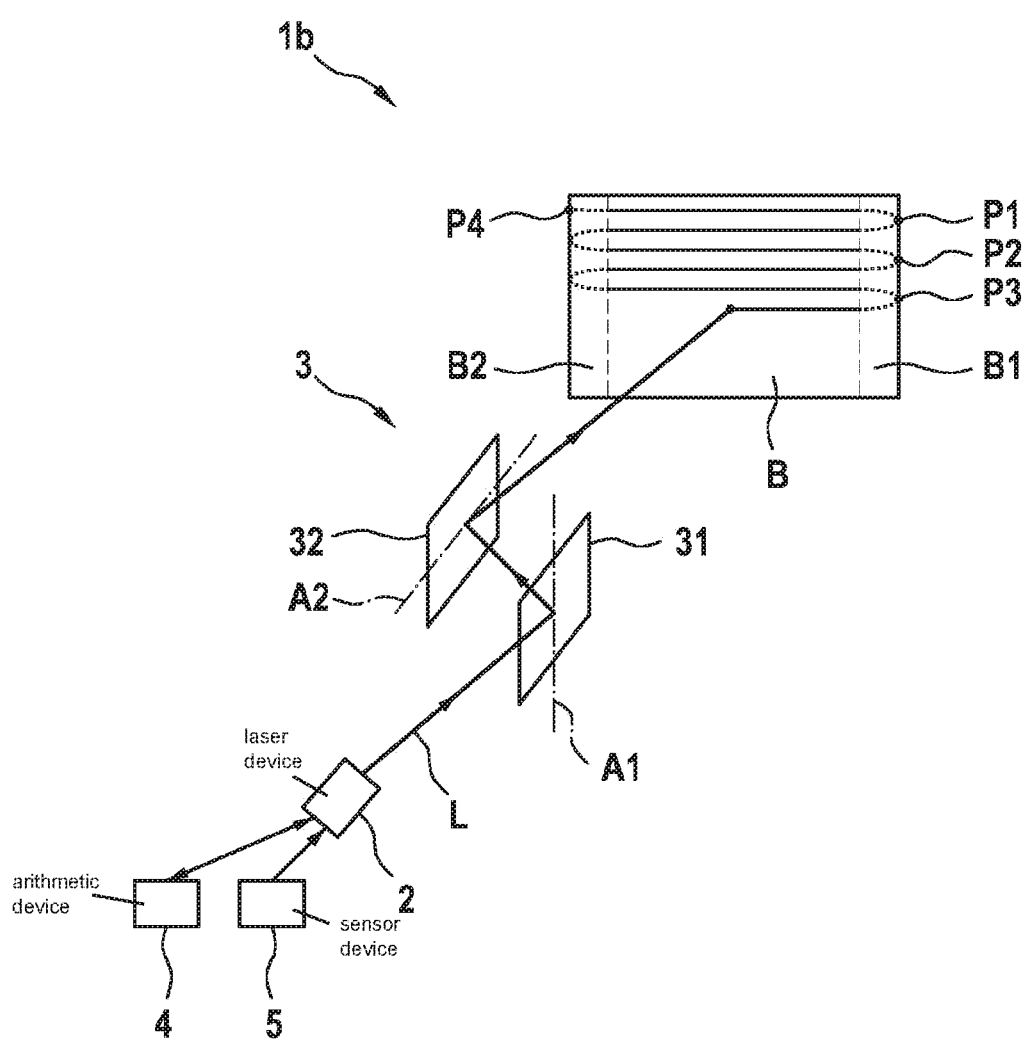
FIG. 4 shows a schematic block diagram of a device for projecting an image according to a second specific embodiment of the present invention.

FIG. 4 shows a schematic view of a device 1b for projecting an image according to a second specific embodiment of the present invention. Device 1b essentially corresponds to device 1a, so that only the differences will be addressed in greater detail in the following text. Micromirror device 3 has a first micromirror 31 and a second micromirror 32, which are pivotable relative to each other about perpendicularly disposed axes A1 and A2. First micromirror 31 is deflected at a high frequency up to a maximal first scanning angle. This deflection produces horizontal, linear scanning. Second micromirror 32 is deflected at a lower frequency up to a maximal second scanning angle, which produces a horizontal deflection of laser beam L. Overall, this produces the illustrated linear scanning of a scanning range B. In order to reduce distortions and an uneven light distribution, edge regions B1 and B2, with the exception of the optical warning signals, are shielded by modulating the laser power with the aid of modulation unit 21. Optical warning signals P1 through P4 are emitted at the reversal point of a linear deflection of laser beam L. A red signal may be emitted, for example.

Optical warning signals P1 through P4 may preferably be emitted at each reversal point. However, it is also possible to emit warning signals P1 through P4 only for a predefined number of reversal points.

Figure 5:
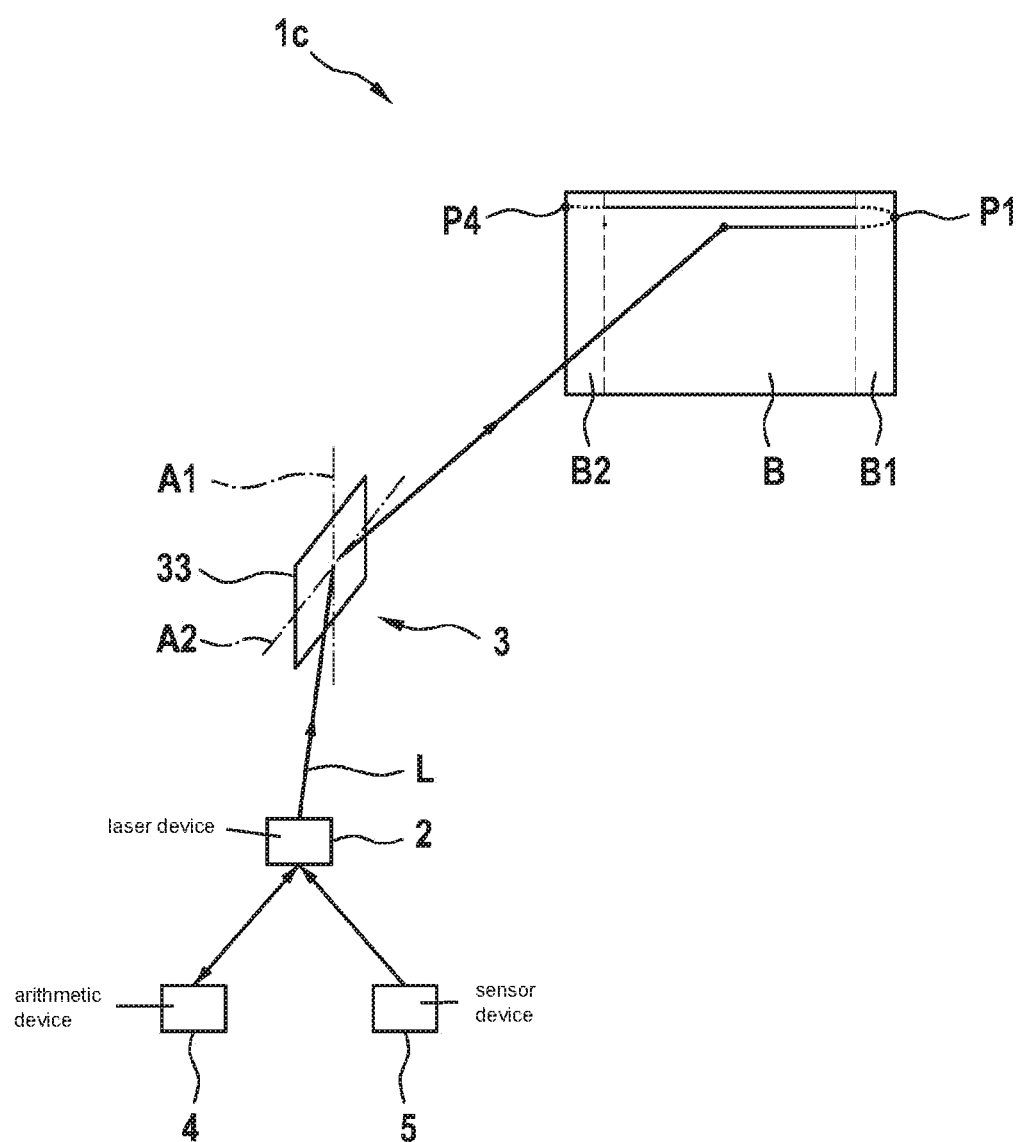
FIG. 5 shows a schematic block diagram of a device for projecting an image according to a third specific embodiment of the present invention.

FIG. 5 shows a block diagram of a device 1c for projecting an image according to a third specific embodiment. In contrast to device 1b, micromirror device 3 has a single micromirror 33, which is pivotable about two orthogonal axes A1, A2. Micromirror 33 executes a fast resonant oscillation about a vertical axis A1 and a quasi-static, slow oscillation about a horizontal axis A2.

Figure 6:
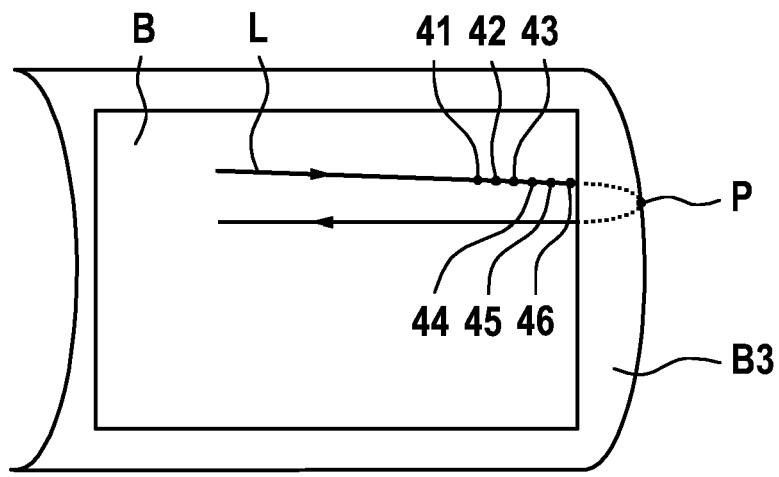
FIG. 6 shows a scanned solid angle region including a shielded region.

FIG. 6 illustrates an exemplary scanning region B. In order to prevent distortions such as distortions due to a projection onto an uneven background or a background that is twisted in relation to micromirror device 3, edge regions B3 are shielded. Laser beam L is able to be emitted in pixel form or pulse form. Corresponding pixels U1 through U6 produce a corresponding image as a function of the image data. In addition, optical warning signals P are emitted at the reversal points, which are located in the shielded region B3 and thus are situated at a distance from the image region or scanning region B.

Modulation unit 21 may be developed to emit optical warning signals P only if the size of shielded region B3 drops below a predefined threshold value.

According to further embodiments, modulation unit 21 may be developed to emit the warning signal as a function of the image data.

Figure 7:
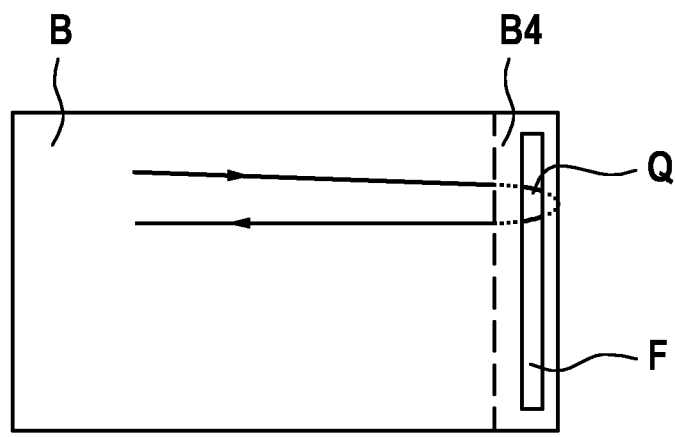
FIG. 7 shows a band-shaped emitted warning signal.

FIG. 7 shows another exemplary scanning region B, which corresponds to the emitted image. In a left-out region B4, a continuous optical warning signal Q is emitted. In view of the multitude of lines, a band-shaped region F of the optical warning signal results for an observer.

Band-shaped region F is preferably located directly at the reversal points of the lines, i.e. in the outermost area of the region able to be scanned with the aid of micromirror device 3. However, band-shaped region F may also be situated at a distance from the reversal points, which is illustrated in FIG. 7.

Figure 8:
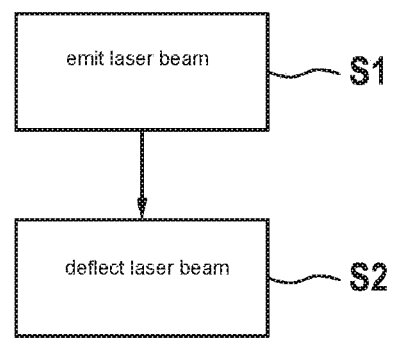
FIG. 8 shows a flow diagram of a method for projecting an image according to a specific embodiment of the present invention.

FIG. 8 shows a flow diagram of a method for projecting an image according to one specific embodiment of the present invention. For this purpose, a laser beam L is emitted in a method step S1 with the aid of a laser device, with image data being modulated onto laser beam L.

In a method step S2, laser beam L is deflected in a linear manner using a micromirror device 3. Laser beam L is modulated in such a way that a predefined optical warning signal is emitted in a region around the reversal points of the linear deflection.

What is claimed is:

1. A device for projecting an image, comprising:
   a laser device configured to emit a laser beam, the laser device having a modulation unit which is configured to modulate image data onto the laser beam;
   a micromirror device configured to deflect the laser beam in a linear manner; and
   an arithmetic unit configured to calculate an energy of the laser beam during the deflection along at least one line;
   wherein the modulation unit is configured to modulate the laser beam in such a way that a predefined optical warning signal is emitted in a region around reversal points of the linear deflection,
   wherein the predefined optical warning signal comprises individual pulses or pixels directly at the reversal points or in a vicinity of the reversal points,
   wherein the modulation unit is configured to carry out the modulation of the laser beam for the emission of the optical warning signal as a function of the calculated energy,
   wherein the energy of the laser beam is calculated during a predefined number of lines to be scanned next, wherein when the ascertained energy exceeds a predefined threshold value, the predefined optical warning signal is output at an end of the next scanned line by the modulation of the laser beam.

2. The device as recited in claim 1, wherein the modulation unit is configured to carry out the modulation of the laser beam for the emission of the optical warning signal as a function of the modulated image data.

3. The device as recited in claim 1, wherein the modulation unit is configured to emit the optical warning signal at an end of a line if the energy of the laser beam during the deflection along this line and/or along adjacent lines exceeds the predefined threshold value.

4. The device as recited in claim 1, wherein the modulation unit is configured to modulate the image data onto the laser beam in such a way that edge regions of the lines are shielded, with the exception of the optical warning signal.

5. The device as recited in claim 4, wherein the modulation unit is configured to carry out the modulation of the laser beam for the emission of the optical warning signal as a function of a size of the shielded edge regions.

6. The device as recited in claim 1, further comprising:
   a sensor device which is configured to output a detection signal when a person is approaching a solid angle region scanned by the micromirror device;
   wherein the modulation unit is configured to carry out the modulation of the laser signal for the emission of the optical warning signal as a function of the detection signal.

7. The device as recited in claim 1, wherein the modulation unit is configured to modulate the laser beam in such a way that a band-shaped region of a predefined color and/or intensity along the reversal points of the linear deflection is continuously emitted as an optical warning signal.

8. The device as recited in claim 1, wherein the modulation unit is configured to modulate the laser beam in such a way that the optical warning signal poses no risk to a human eye.

9. A method for projecting an image, the method comprising the following steps:
   emitting a laser beam using a laser device, image data being modulated onto the laser beam;
   linearly deflecting the laser beam using a micromirror device; and
   calculating an energy of the laser beam during the deflection along at least one line;
   wherein the laser beam is modulated in such a way that a predefined optical warning signal is emitted in a region around reversal points of the linear deflection,
   wherein the predefined optical warning signal comprises individual pulses or pixels directly at the reversal points or in a vicinity of the reversal points,
   wherein the modulation unit is configured to carry out the modulation of the laser beam for the emission of the optical warning signal as a function of the calculated energy,
   wherein the energy of the laser beam is calculated during a predefined number of lines to be scanned next, wherein when the ascertained energy exceeds a predefined threshold value, the predefined optical warning signal is output at an end of the next scanned line by the modulation of the laser beam.

10. The device as recited in claim 1, wherein the laser device includes a green, a blue and a red laser, and the predefined optical warning signal is emitted only by the red laser.

* * * * *